(12) United States Patent
Sery

(10) Patent No.: US 8,267,812 B1
(45) Date of Patent: Sep. 18, 2012

(54) PUTTING/CHIPPING TRAINER

(76) Inventor: Joseph Sery, San Diego, CA (US)

( * ) Notice: Subject to any disclaimer, the term of this patent is extended or adjusted under 35 U.S.C. 154(b) by 212 days.

(21) Appl. No.: 12/799,317

(22) Filed: Apr. 22, 2010

(51) Int. Cl.
*A63B 69/36* (2006.01)

(52) U.S. Cl. .......................................... 473/409; 473/257

(58) Field of Classification Search .................. 473/219, 473/226, 229, 257, 258, 259, 260, 261, 266
See application file for complete search history.

(56) References Cited

U.S. PATENT DOCUMENTS 7,749,109 B2 * 7/2010 Jang et al. ..................... 473/409
7,806,780 B1 * 10/2010 Plunkett ........................ 473/257
2002/0077189 A1 * 6/2002 Tuer et al. ..................... 473/151
2006/0025229 A1 * 2/2006 Mahajan et al. .............. 473/131

* cited by examiner

*Primary Examiner* — Nini Legesse

(57) ABSTRACT

A putting/chipping training apparatus and method which allow a trainee to develop an effective putting/chipping stroke through the use of a motion-generating device that, using the trainee's selected golf club, e.g. putter, repeatedly replicates the trainee's most comfortable swing or one patterned thereafter or one that is modified to incorporate well-accepted fundamentals. The device achieves this desired end by effecting rotational movement on two parallel axes simultaneously with linear movement to move the club through the swing path, with the trainee's hands gently holding the grip. The method is individualized by first tracking the trainee's desired stroke to create an average swing path for one stroke which is entered into a databank and can then be precisely replicated.

3 Claims, 11 Drawing Sheets

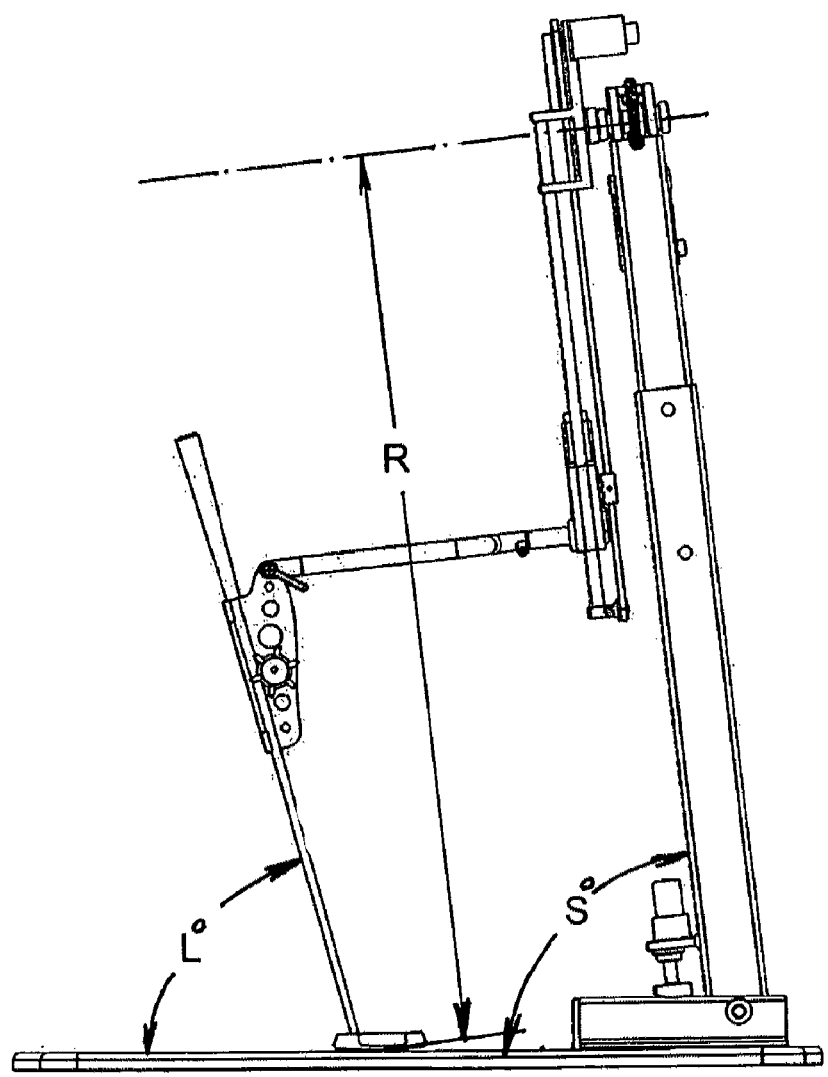
Fig. 5
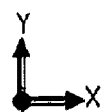

PUTTING/CHIPPING TRAINER

FIELD OF THE INVENTION

The present invention generally relates to golf, and more particularly relates to a golf training device. The present invention can be used to train a golfer to both chip and putt a golf ball.

BACKGROUND OF THE INVENTION

The present invention is based on the theory that there is no single most efficient method of putting or chipping in the game of golf. This can be seen on the professional golf circuits where many different putting and chipping stroke styles are used by these top players. It is therefore assumed (and confirmed by those who are skilled in the art of golf training) that the most important issue with putting and chipping is the consistency and the repeatability of the individual stroke. Using new electronic measuring devices, it has been shown that putting stroke can properly propel the ball to the hole every time if it is perfectly repeated. used to evaluate the putting stroke prove that any stroke-type can propel the ball to the hole every time if it is perfectly repeated.

Using previous known putting and chipping training devices, it is the trainee who generates the power to move the golf club, while the device only helps directing the golf club in a given or set stroke path. Improved training devices have been sought to sharpen one's skills.

SUMMARY OF THE INVENTION

It has been found that a training device should advantageously be instead designed to teach a golfer how perfectly repeated putting and chipping strokes should feel. To achieve this purpose, an apparatus has been created to generate, for example, the precise stroke with which the golfer is most comfortable whilst the trainee is simply gently holding the gripped club shaft and allowing his/her hands and body to follow along the path of movement of the device. In other words, the trainee generates no club movement on his/her own; rather the movement of the club by the training apparatus is repeatedly experienced by the trainee.

More specifically, the present invention provides a golf putting/chipping training apparatus and method that effectively teaches a golfer the feeling of swinging his/her putter or chipping club in a perfectly repeated stroke. The apparatus is initially set in accordance with measurements taken of the trainee-golfer using his/her own club; the apparatus then repeatedly moves the club along one specific putting or chipping swing path by generating movement along 3 axes. The shaft of the trainee's club is connected to a motion-generating device, which forms a major portion of the apparatus and, driven by servo-electric motors, effects a repeated putting or chipping stroke.

In one embodiment of the method, the golfer, using his/her own putter or chipping club, is initially asked to make multiple, e.g. 5, putting or chipping strokes with a tracking device attached to the shaft of the club between the grip and the head, repeating the same stroke as exactly as he or she can. The trainee may be standing in a position near the apparatus, and with the aid of electronic-motion detectors in the form of accelerometers and gyroscopic devices, the character and precise path of each of the golfer's 5 strokes are recorded in the memory in the tracking device for the purpose of creating a precise definition of his/her average stroke. This is done with the use of existing technology using a device such as the Tomi or the Science & Motion Sport (Sam) tracking device. The recorded data may be subjected to electronic analysis in the tracking device to define the precise motion of the golfer's average stroke; and such is then transmitted to the CPU of the training apparatus. Alternatively, the raw data may be transmitted to the CPU of the training apparatus for analysis therein. With this information in the CPU and keyed to an individual golfer, the training apparatus is adjusted to certain measured angles of the trainee's stance. Once so adjusted and activated, it uses this recorded motion analysis to cause the club shaft to repeatedly, precisely perform the precise movement of the average recorded stroke. This allows the trainee to simply take a comfortable position, gently holding the moving golf club shaft, and experience the same repeated stroke in order to feel the dynamics of that stroke and imprint such in his or her muscle memory.

BRIEF DESCRIPTION OF THE DRAWINGS

FIG. 5 is a right side view of the apparatus labeled to show certain parameters that are measured and then set for each trainee.

DETAILED DESCRIPTION OF THE PREFERRED EMBODIMENTS

The putting stroke is a complex motion comprised of simultaneous movements on a number of axes. To have a mechanical device accurately recreate the stroke, it has been found that both rotational and linear movement must be defined along several axes. Once so defined, a comparable recreation of the swing path movement of the golf club can be accomplished by employing different rotational mechanisms and linear slides to simultaneous generate movements along such axes. A training apparatus has been constructed which includes such an electromechanical device that generates this swing path motion, which device is hereinafter sometimes referred to as a putting robot.

Figure 1:
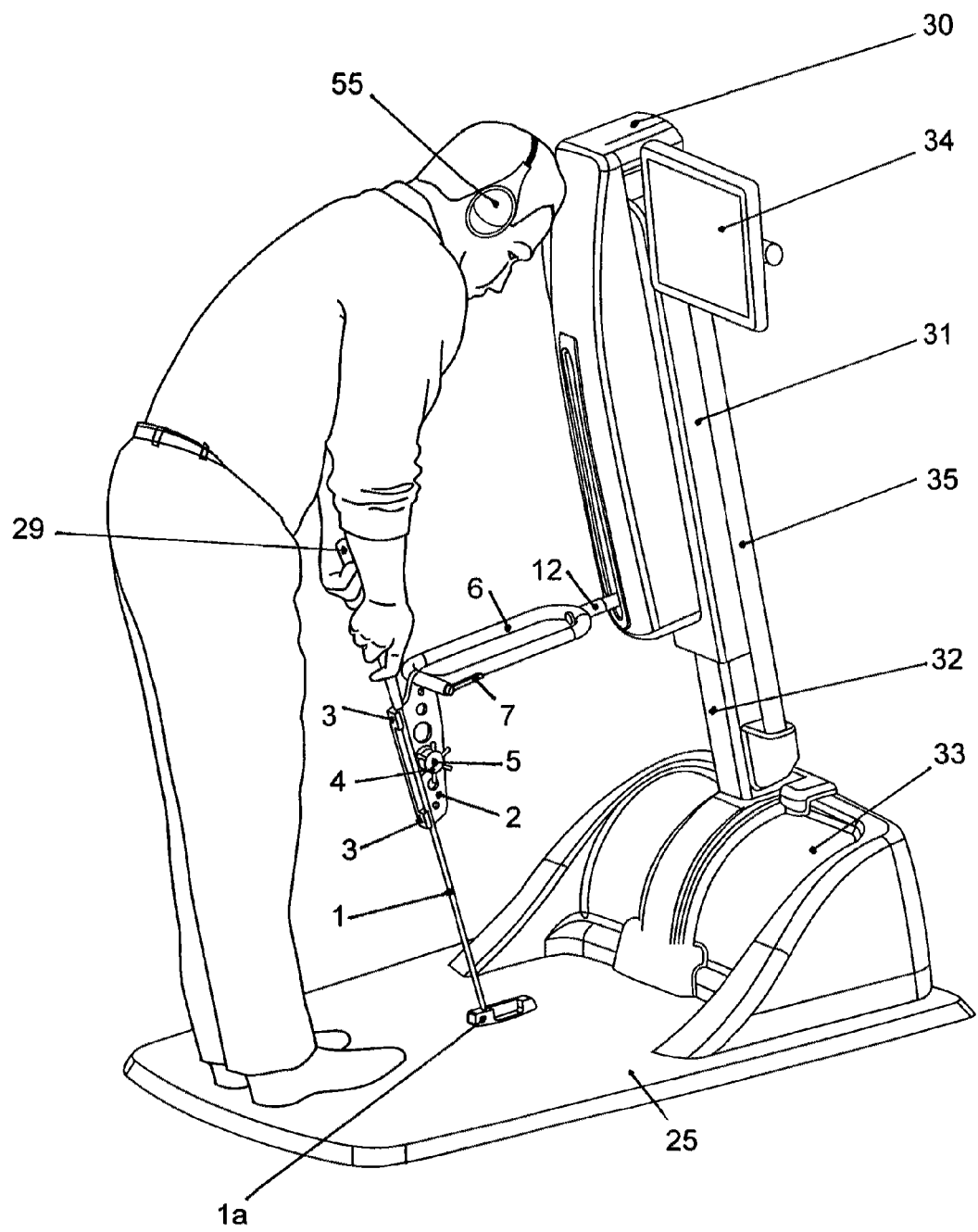
FIG. 1 is an illustration of a trainee holding the club grip as he would execute a putt with the club shaft attached to the motion-generating device of the training apparatus.

A representative putting/chipping training apparatus that is used as a part of the training method is illustrated in FIG. 1, where the golfer trainee is shown standing on the floormat portion of the apparatus lightly gripping a putter which is attached to an upstanding motion-generating device. More details of the device can be seen in FIG. 2 where the decorative covers and the illustration of the trainee golfer have been removed. The golf training apparatus is designed to reproduce an individual's average putting or chipping stroke so that, by repeatedly following, i.e. experiencing, such a mechanically produced stroke while the trainee's hands are lightly gripping the club, the trainee develops the "feel" of this stroke. As a result of such repeated training, his or her muscles learn to faithfully reproduce substantially the exact same stroke for use in a particular putting or chipping situation.

Although various computer-driven mechanical devices might be constructed to which golf club might be removably attached by its shaft, which device will then move that club along a precise swing path, one particularly advantageous embodiment is described hereinafter in connection with the illustrations shown in FIGS. 1-8B.

To secure a golf club 1, e.g. a putter, in the operative position on the training apparatus, an attachment plate 2 is provided that is detachably fastened in a suitable way to the shaft of the golf club 1. The attachment plate 2 is preferably located on the shaft just below the lower end of the club grip 29. Any suitable mechanical fastening arrangement can be used; however, preferably, the arrangement is one that allows the quick attachment/detachment of the attachment plate 2 to the golf club 1. Illustrated is an arrangement where the attachment plate 2 includes a pair of transversely-extending small blocks 3 having V-shaped cavities into which the shaft of the golf club 1 is received. The club is then temporarily locked in place, simply and quickly, by turning a spoked hub 4 that includes an eccentric cam; as the hub is rotated on a center axle or pin 5, the cam slides along the shaft and locks the shaft in place, pressing it into the two V-shaped cavities. The attachment plate 2 is in turn connected to a generally horizontally aligned holder 6 using a suitable clamping mechanism. The holder 6 preferably has the shape of a tubular open frame or oval so that the trainee can clearly look downward with an unobstructed view onto the clubhead. The rear end of the holder 6 is connected to a shaft 12 that is operatively connected to the motion-generating device. The front end of the holder 6 incorporates a pin and sleeve arrangement that ends in a lever 7 which allows the sleeve to clamp a region of the attachment plate 2 to the window frame holder 6 aligned at a desired angular attitude to the plane thereof.

The shaft 12 which supports the open frame holder 6 is connected to a first rotary motion mechanism 8 that is designed to oscillate the shaft 12 (and the holder 6) a predetermined number of degrees in either direction from an at rest or address position where the open frame holder 6 lies in a plane perpendicular to a vertical plane extending fore and aft through the center of the motion-generating device. In the position shown in FIGS. 2 and 3, this first rotary motion mechanism 8 is located near the bottom of a depending arm 9; however, it is mounted on the arm 9 so as to allow its adjustment longitudinally therealong. For example, the arm 9 may include a pair of parallel rails 9a, which may be circular or have any suitable cross-section; the first rotary mechanism 8, which has a block-like housing or casing, will slide linearly along the rails 9a so as to travel up and down the depending arm 9. Its linear movement is controlled in any suitable manner; one embodiment of such control is shown in FIG. 3. Illustrated is a V-belt or timing belt 10a driven by a pulley attached to a stepper or servo motor 10 mounted atop the arm 9. Driving the timing belt or the V-belt 10a in either direction will serve to raise or lower the first rotary motion mechanism 8 on the pair of arms 9a of the depending arm 9, and thus raise and lower the shaft 12 that supports the holder 6.

As hereinbefore mentioned, the attachment plate 2 is secured to the tubular open frame holder 6 which is supported by the shaft 12. Any suitable rotary motion mechanism 8 for oscillating the shaft may be employed; one such embodiment is best seen in FIG. 3. Within the block-like housing of the mechanism 8, a wheel 14 is located which includes an interior helical slot 15. The wheel 14 is rotated by a stepper or servo motor 16 mounted thereabove, and rotation of the wheel causes resultant vertical movement of a lever 13 that is suitably linked to a region of the shaft 12. The shaft 12 extends from the holder 6, through a cylindrical bearing or bushing 11 in which the shaft is journaled, and into the casing of the mechanism 8 where it is interconnected with the lower end of the level 13. Up and down movement of the lever 13, driven by the helical groove arrangement within the wheel 14, results in oscillating rotation of the shaft 12; such motion causes the tubular open frame holder 6 and the putter shaft to rotate first in one angular direction and then in the other.

The depending arm 9, which carries the first rotary mechanism 8 at a location spaced from the upper end thereof, is caused to move in a swinging motion simulating that of a pendulum. The pair of parallel side rails 9a are seated in an upper bracket 17 that is affixed to a shaft 18 (FIG. 4) which is a part of a second rotary drive mechanism 19. The second rotary mechanism is supported by a bracket 20 located at the upper end of a main post 23 which includes a pair of telescoping parts which allows it to be lengthened or shortened as desired. More specifically, the illustrated main post 23 includes a pair of interfitting square tubes 21, 22; the interior tube 21 sliding within the confines of the surrounding outer tube 22 supported therewithin by a plurality of lubrication-free gliders to allow extension/retraction of the interior tube. The bracket 20 is suitably fixed to the upper end of the interior tube 21, and appropriate extension of the interior tube 21 serves to position the axis of the second rotary drive mechanism 19 at the precise vertical level desired to replicate the swinging movement of the particular golfer whose identity has been input into the CPU and to whom the training session is being directed.

Any suitable electromechanical drive arrangement can be used for the second rotary drive mechanism 19. For example, a pair of worm gears operated by servo motors may be carried by the bracket 20 at the upper end of the interior tube 21 and alternately operated to cause the desired oscillation of the main rotating shaft 18 that swings the depending arm 9.

Figure 4:
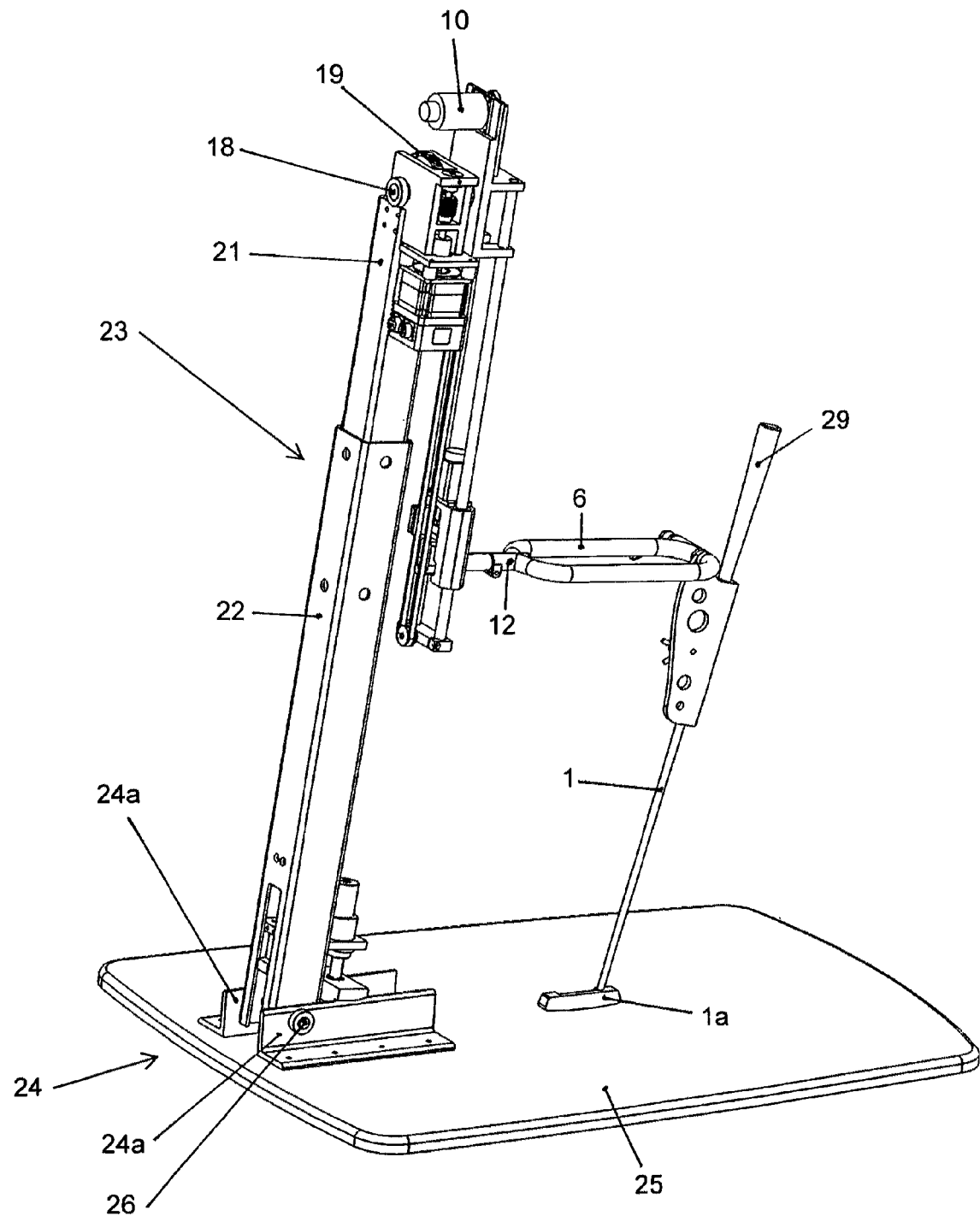
FIG. 4 is a perspective view similar to FIG. 2 taken from the rear left side of the apparatus.
Figure 4A:
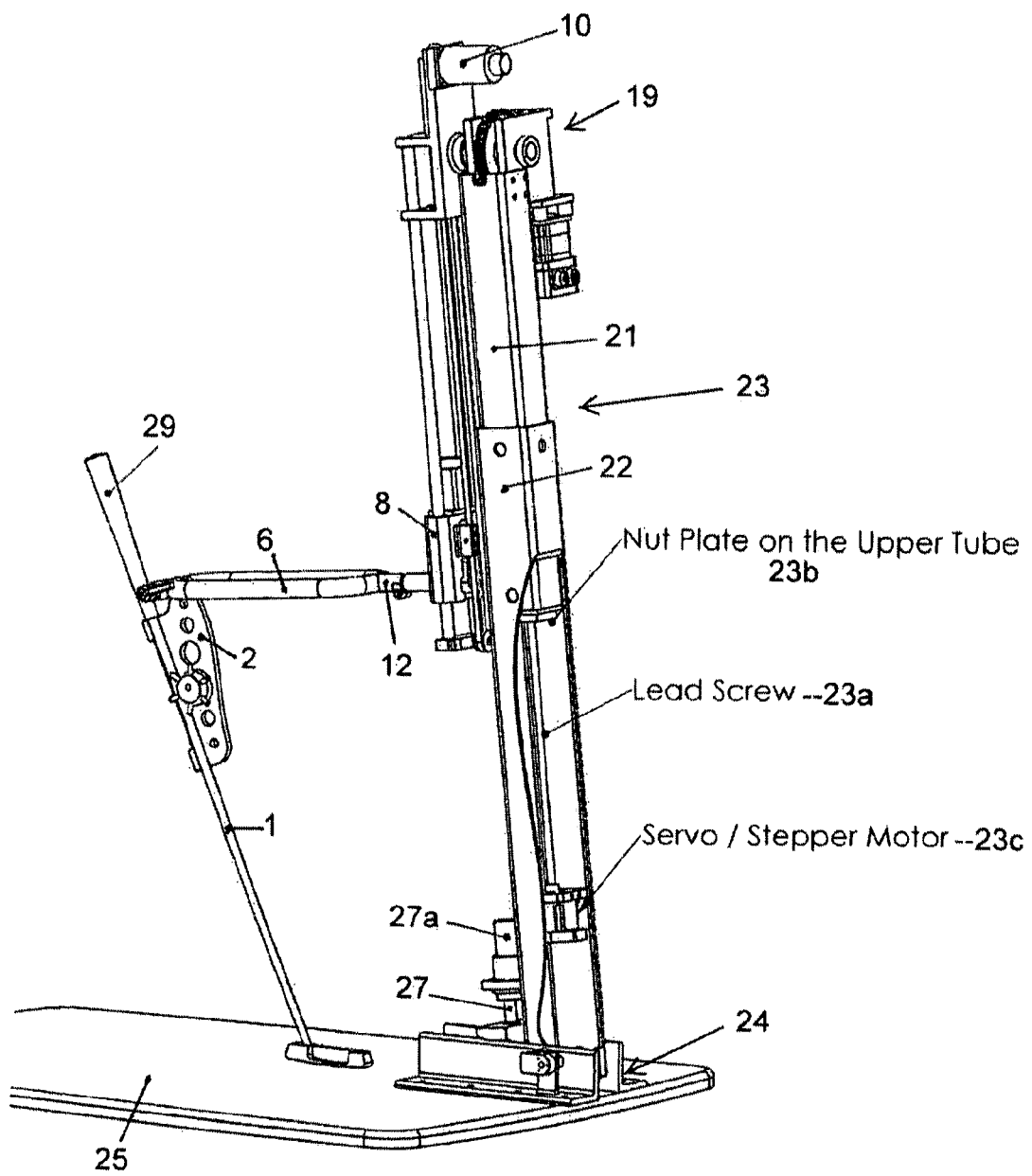
FIG. 4A is a perspective view similar to FIG. 4 taken from the right rear of the apparatus.
Figure 4B:
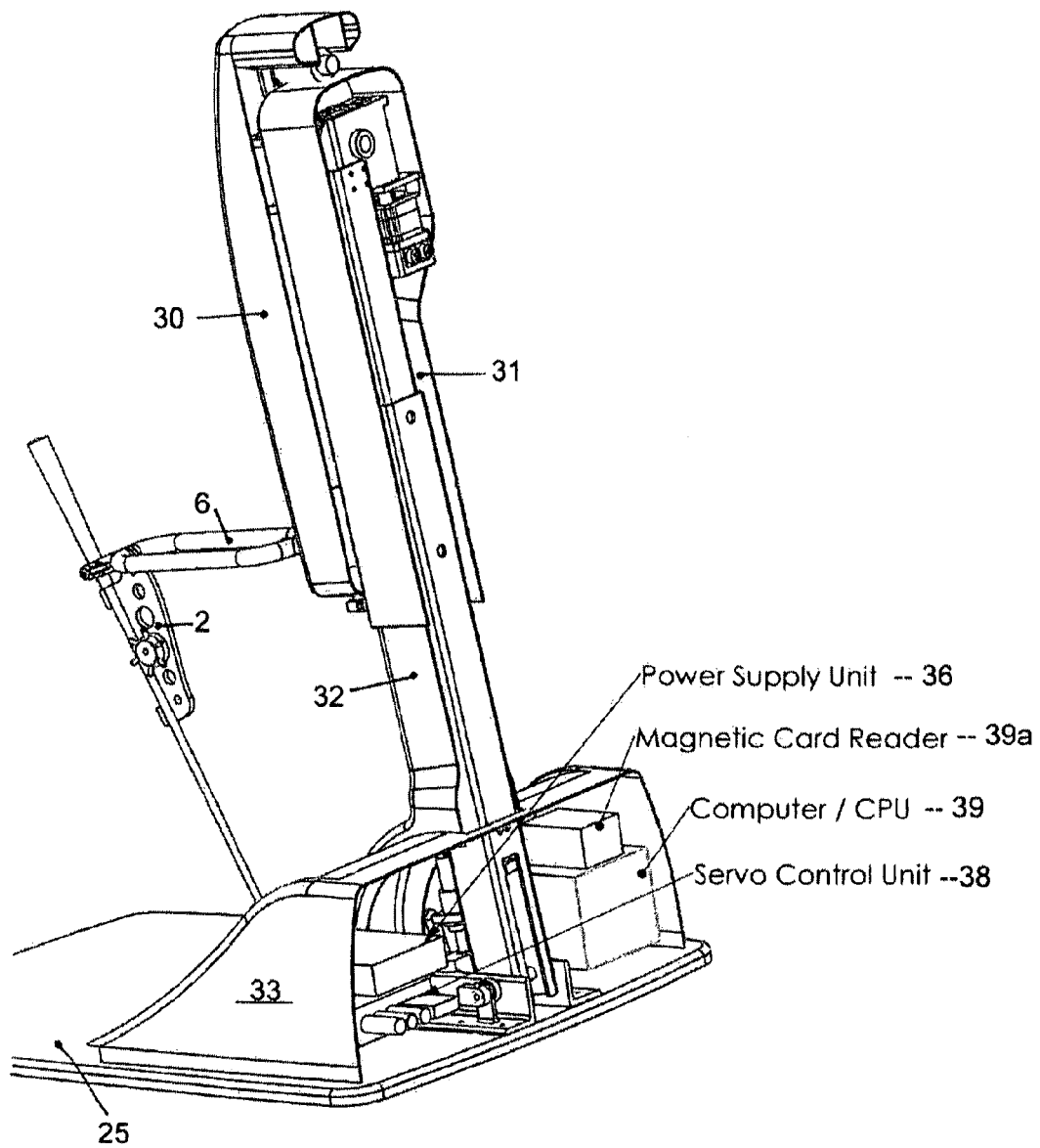
FIG. 4B is a perspective view of the training apparatus of FIG. 1 with the covers in place taken from the right rear.

As best seen in FIG. 4A, the vertical height of the upper rotating shaft 18 is adjusted using the telescoping main post, with the sliding action of the interior tube 21 within the exterior tube 22 being controlled in any suitable manner. For example, a lead screw 23a may be attached to a nut plate 23b secured to the lower end of the interior tube and driven by a servo motor 23c, all of which can be conveniently located within the confines of the exterior tube 22. Such is shown in the broken away portion of FIG. 4A, but a comparable drive could of course be located in some other convenient location.

The main post 23 is supported at its lower end by a pair of spaced apart angle iron brackets 24a that constitute a base 24 and which are mounted on a flat platform 25 that may, if desired, be covered with closely cropped artificial grass to give the impression of a putting green. The lower end of the main post 23 is pivotally mounted between the two angle iron pieces 24a which constitute the base by a pin 26 which penetrates both angle irons and the exterior tube 22 through a hole located far enough above the lower end so the exterior tube can be pivoted angularly with respect to the vertical. The post 23 will always be tilted forward at some angle to the vertical, and gravity will maintain it in such alignment. If desired, stops (not shown) can be incorporated in the base to prevent the post 23 from reaching vertical alignment. A desired tilt angle in order to set the swing plane of the depending arm 9 for a particular trainee is then established by the CPU. The angle of tilt is controlled by a small lead screw 27 which is driven by a servo motor 27a mounted on a bracket affixed to the front face of the exterior tube 22; the lead screw has a threaded end that is journaled in a specialty nut 28 that spans and is seated between the pair of angle iron base members 24a upon which it rests. Thus, rotation of the lead screw 27 so as to shorten the distance between the supporting bracket and the specialty nut 28 causes the main post 23 to tilt forward to a greater degree by gravity and thus adjust the swing plane angle at which the depending arm 9 will oscillate when the motion-generating device is actuated.

Figure 2:
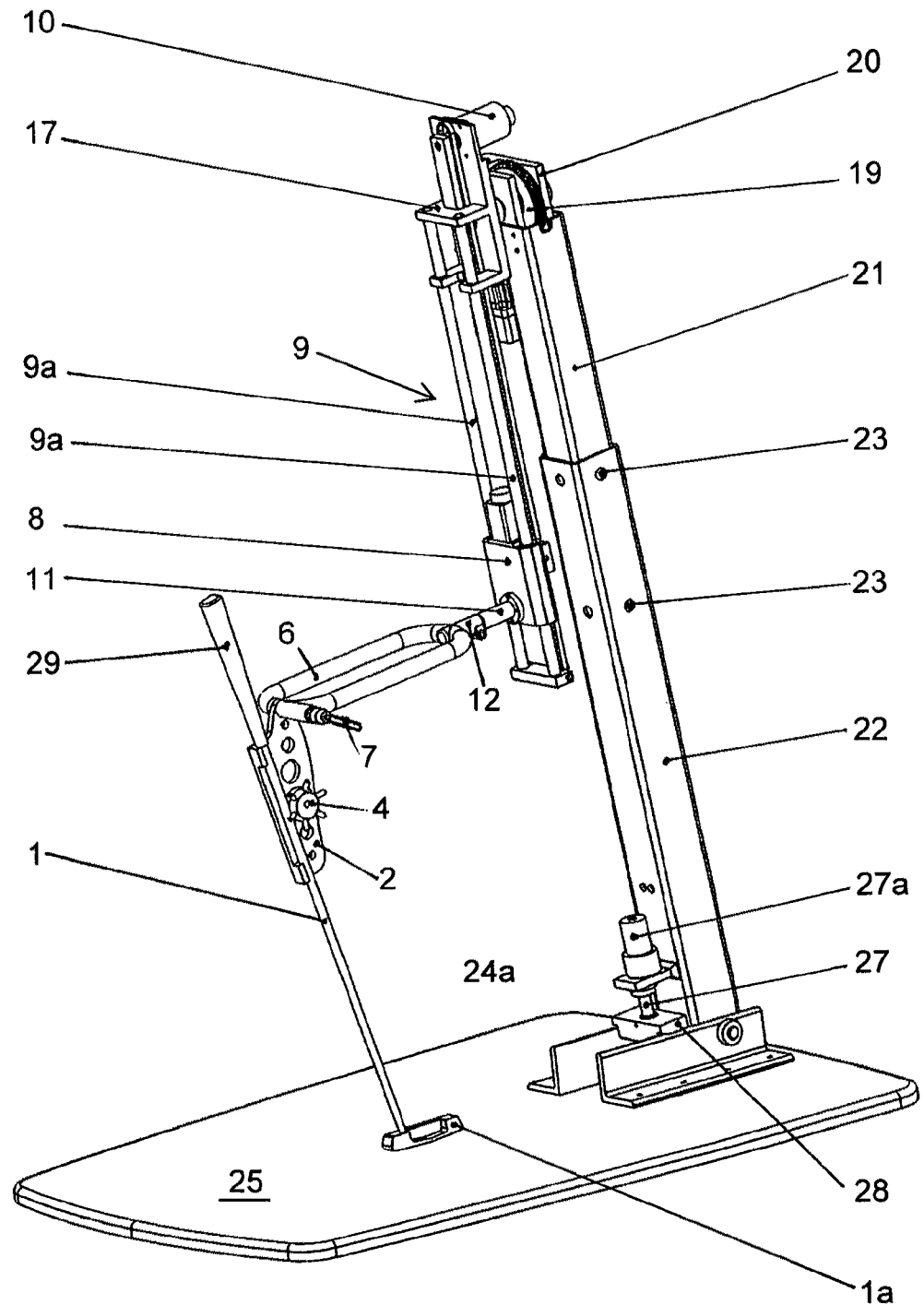
FIG. 2 is an illustration of the apparatus of FIG. 1 without the trainee and with the covers removed.
Figure 3:
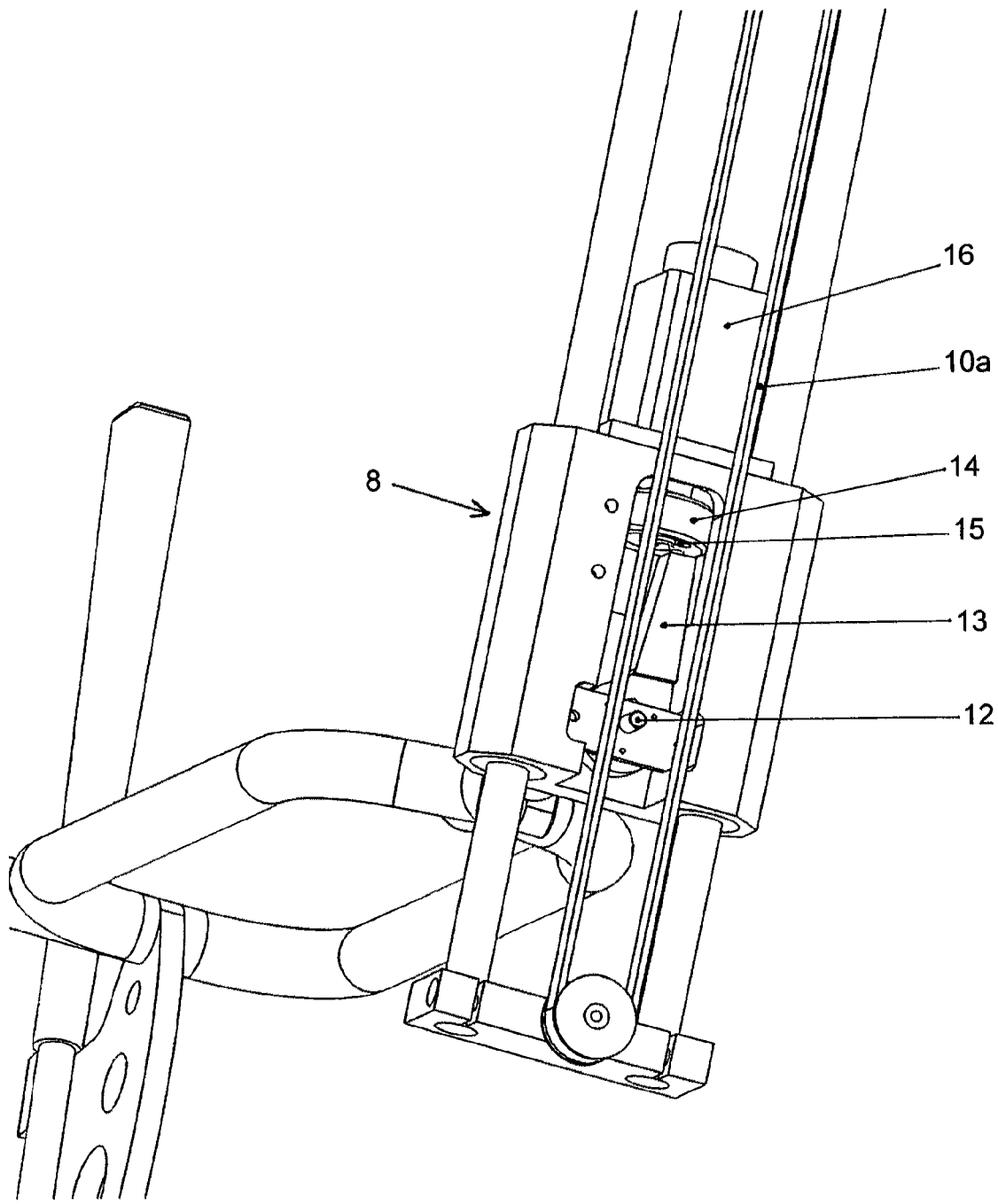
FIG. 3 is a fragmentary perspective view of a portion of the motion-generating device of FIG. 2 taken from the rear thereof.

By comparison of FIGS. 1 and 2, it can be seen that the upper portion of the training apparatus is preferably enclosed by decorative covers 30 and 31. This set of decorative covers includes a swing arm cover 30 which is attached to and pivots along with the depending arm 9 which it encloses and an upper arm cover 31 which fits over the upper end of the telescoping main post 23. A lower arm cover 32 covers the lower post region together with a bottom cover 33.

It is preferably within the confines of the decorative bottom cover that a main CPU 39 and a control system 38 are mounted on the platform; these include servo controls for the putting robot and all other electrical and electronic components. A touch screen display 34 is mounted on a support conduit 35 extending upward from a lower region of the outer tubular post 22. The column support tube 35 allows electrical connections or other communication to be provided between the touch screen display 34, the CPU and a power supply unit 36 which is mounted atop the servo control unit or control system 38 in the region below the decorative lower cover 33. The main computer/CPU 39 is located in the opposite side of the lower covered region. A magnetic card reader 39a may be mounted atop the computer 39 near the surface of the cover. Although a slot might be provided in the cover for the insertion of a magnetic card which identifies a particular trainee who has registered to use the training apparatus and who has his or her unique data stored in the computer databank, the reader 39a is preferably one that will read the information from the magnetic card when it is placed near the polymeric bottom cover 33. Alternatively, the card reader might be incorporated into the touch screen display unit 34.

The flat platform 25, which constitutes the overall base of the apparatus, has the angle iron base 24 secured to its upper surface and is covered by a suitable carpet or artificial grass that simulates the texture of a putting green or the like. If desired, markings can be provided on its upper surface to assist the trainee in visualizing the putting direction, the ball position, the preferred putter alignment and even suggested increments of length by which the trainee can guide his or her backswing and follow-through.

To prepare the training apparatus for a lesson for a particular trainee, the swing plane angle (S°), the swing radius (R), and the lie angle (L°), are set to the parameters determined for the particular trainee. These parameters then remain fixed throughout the putting or chipping stroke lesson for each trainee. These specifications for each particular trainee are suitably determined in a manner that matches the body orientation to which the trainee has become accustomed for such golf stroke. As one preferred example, these settings are determined with the aid of a specially designed wall chart 40. The three particular parameters are illustrated in FIG. 5 which is a right side view of the apparatus shown in FIG. 2 with the three parameters marked thereon.

Figure 6:
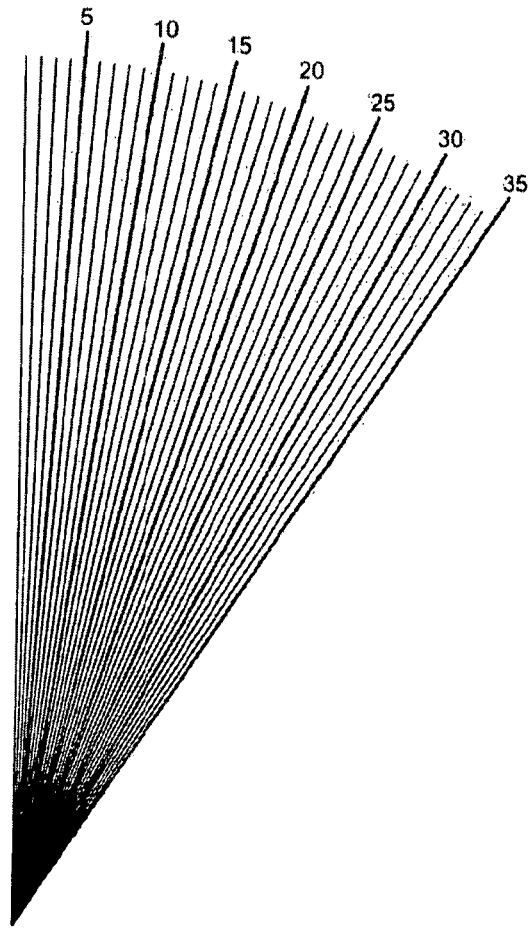
FIG. 6 is a copy of a wall covering that shows two charts that may be employed in measuring parameters that are characteristic of each particular trainee.
Figure 7B:
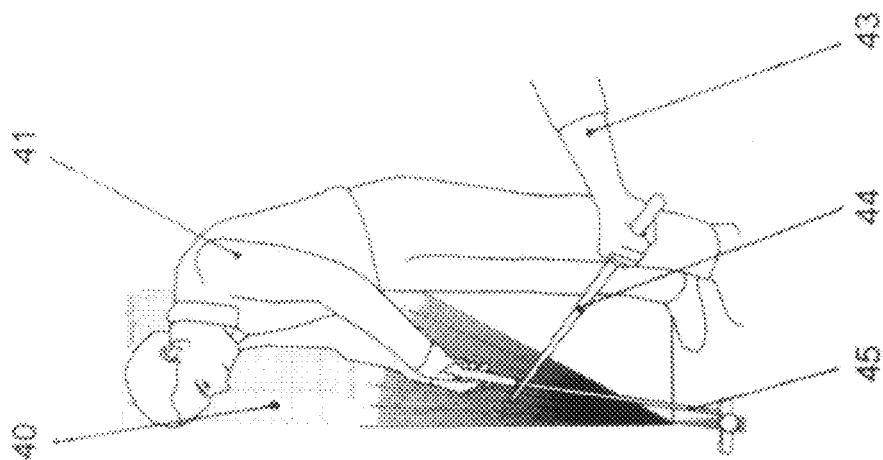
FIGS. 7A and 7B illustrate the use of the charts of FIG. 6 in making trainee measurements.
Figure 7A:
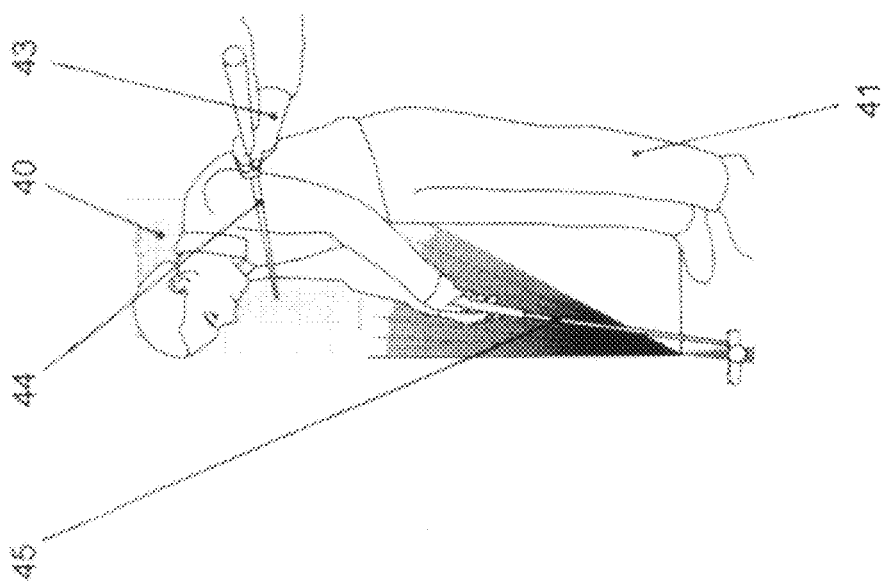

FIG. 6 shows a wall chart which can be used to determine the settings for a particular golfer trainee in preparation for his or her training lesson. The chart may be mounted upon a vertical wall, in front of which the golfer trainee 41 will be asked to take his or her customary stance for the putting/chipping stroke that will be the subject of the lesson. As shown in FIGS. 7A and 7B, the player 41 stands gripping a club, e.g. a putter, positioned to stroke a golf ball along a line essentially perpendicular to the wall on which the specially designed wall chart 40 is mounted and some 8-15 inches away. The necessary measurements are made using the chart 40 and either a straight pointer 44 or a laser light while the golfer is addressing the ball with his/her club in the position to which the player has become accustomed. FIG. 7A shows the pointer 44 being held by the arm 43 of the teacher and aligned with the upper chest region of the player just below the collarbone. In this position, it is determined which particular square within the numbered squares in the 21 horizontal rows of numbered squares (that are located from 35 inches to 55 inches above the floor) is in alignment with the pointer 44 so held against the player taking his or her stance to address the ball. The particular horizontal row on the chart to which the pointer 44 is directed determines the distance R in FIG. 5 referred to as the trainee's swing radius. It establishes the vertical distance above the platform 25 where the shaft 18 should be located about which the depending arm 9 will swing to duplicate the player's swinging motion. The numbered squares in each particular row increase in value from 8 to 18 and are used to determine the swing angle S° at which the main post 23 should be tilted from the vertical, as seen in FIG. 5. Thus, the location of the one square on the chart is representative of the height and comfortable alignment of the player and determines the optimum swing plane and the optimum swing radius appropriate for this player gripping this particular club when held at such a lie angle.

In FIG. 7B, the pointer 44 is shown in contact with the shaft of the putter just below the grip and aligned at an angle perpendicular to the wall chart. The particular ray of the series of rays 45 which appear on the chart to which the pointer is directed is indicative of the lie angle L° for that club being held by the player who is addressing the ball. It will be understood that the chart 40 is developed for use with a right-handed trainee, and a mirror-image version thereof will be provided for left-handed trainees.

Figure 8A:
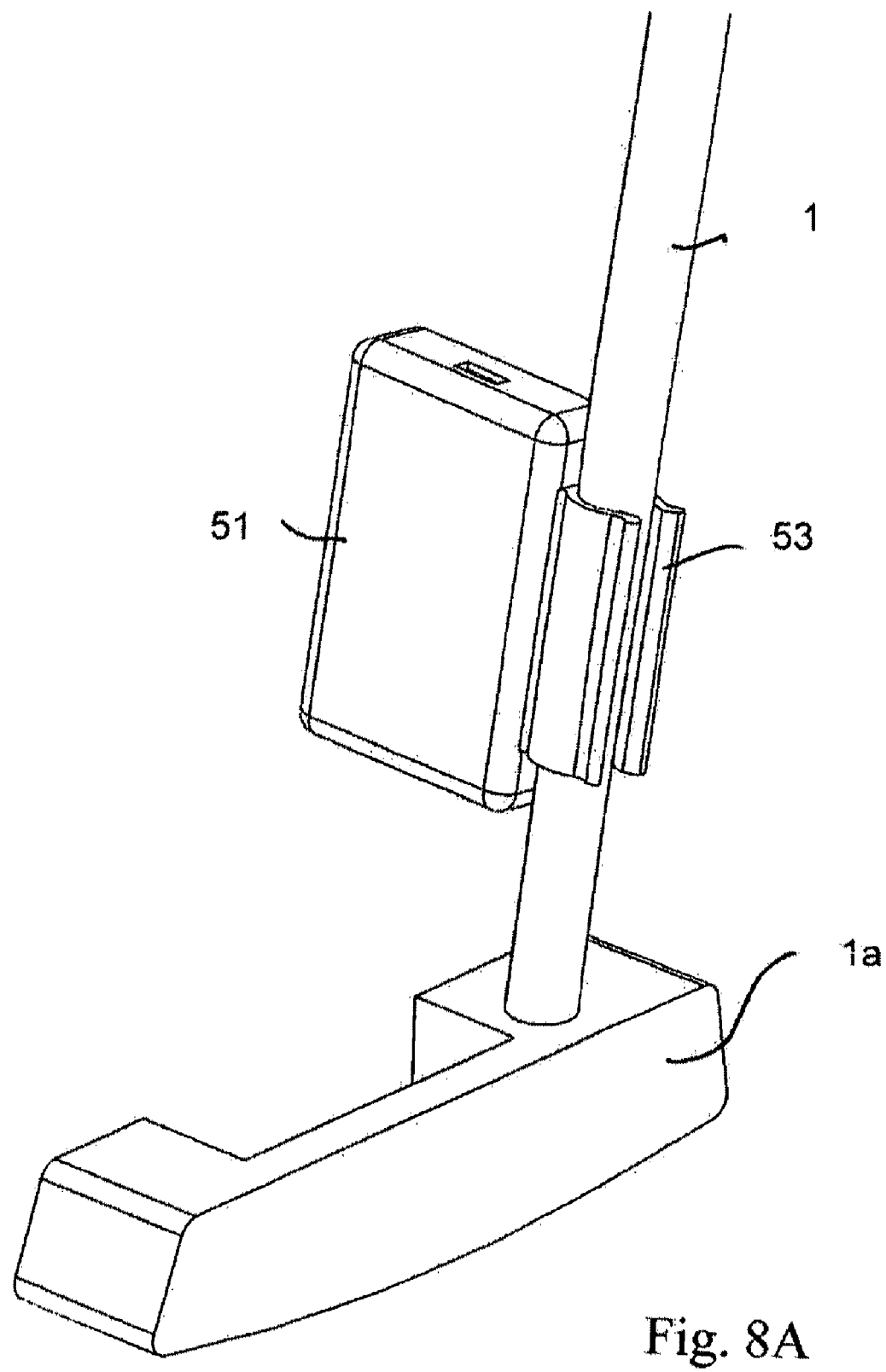
FIG. 8A is an enlarged fragmentary perspective view of a putter having a tracking device attached to the shaft thereof.
Figure 8B:
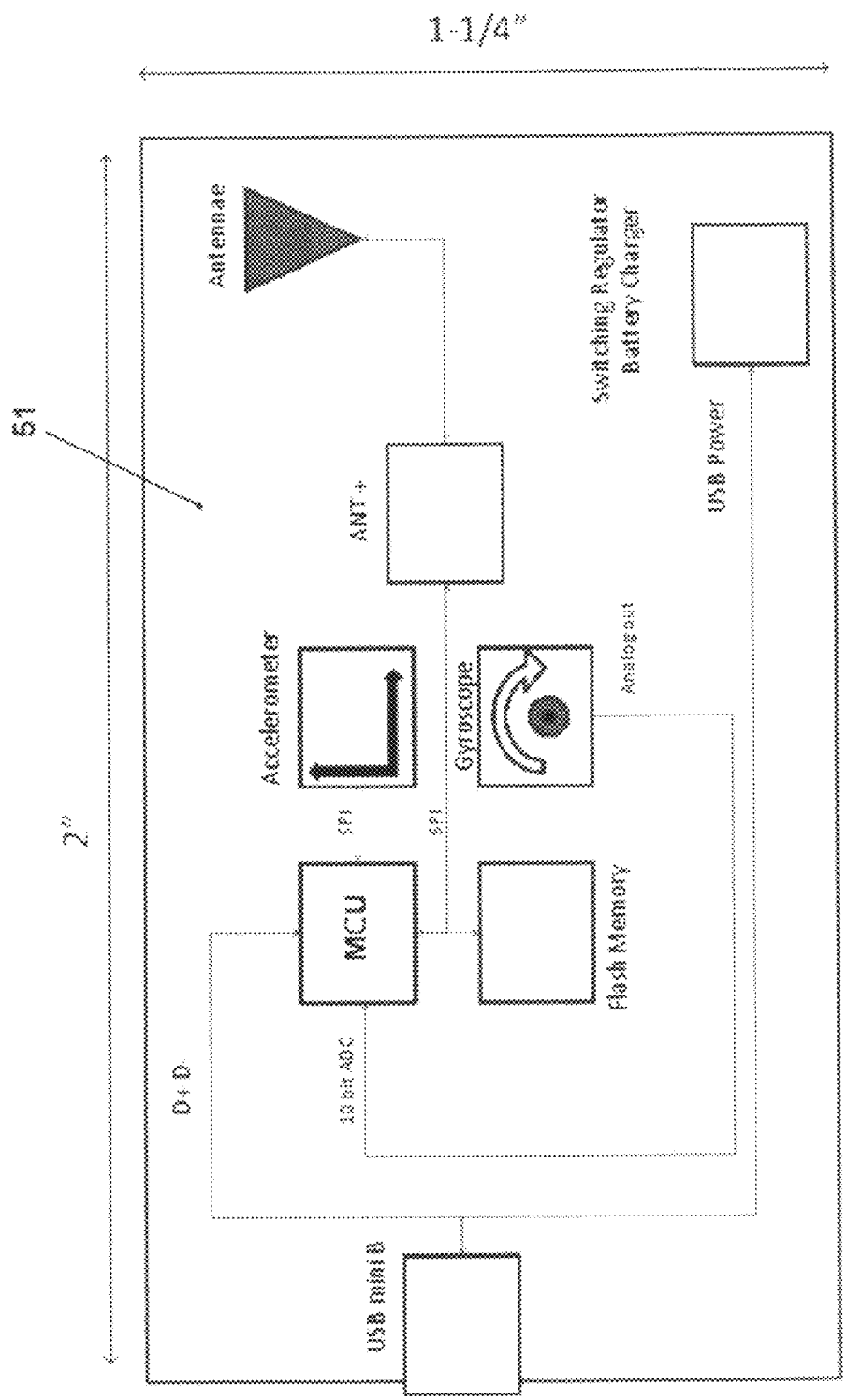
FIG. 8B is a schematic showing the operation of a representative tracking device such as that depicted in FIG. 8A.

As earlier indicated, a tracking device 51 is detachably connected to the shaft of the golf club 1 to be used in the lesson, preferably at a predetermined distance above the clubhead 1a. This tracking device 51 includes gyroscopes and accelerometers and associated battery-powered memories which will create an entire record, from address, backswing, forward swing and follow-through, of a golfer's typical stroke with that club. One such exemplary tracking device is shown in FIG. 8A attached by a suitable clip 53 to a putter position a few inches, e.g. about 4 inches, above the sole or undersurface of the clubhead 1a. The schematic drawing shown in FIG. 8B is exemplary of such a tracking device 51 which can accumulate the recorded swing path movements of the player; this is representative of a commercially available software application. Depending upon the system used, once the player has completed the desired number of repeated swings to create an average swing pattern for this particular golfer, the accumulated data can be transferred to the CPU of the training apparatus. This can be done by downloading the data through a connector and USB ports; alternatively, the tracking device 51 can be equipped with an antenna which will transmit the data during or after each stroke, or when so directed after all the data has been accumulated for the total number of strokes. As mentioned hereinbefore, the analysis can be carried out within a particular tracking device 51; however, analysis is preferably performed in the CPU of the training apparatus using state of the art software.

Thereafter, when through the computer touch screen and/ or by the magnetic card reader, a particular trainee is identified, the training apparatus can be activated, and the apparatus will adjust the swing radius dimension R by appropriately actuating the servo motor 23a which causes the lead screw to appropriately extend or retract the interior tube 21 which telescopes within the exterior tube 22 to the desired length. The adjusting device at the base of the main post 23 is likewise actuated so as to tilt the post to the appropriate swing plane angle S° for this particular player using the motor 27a that drives the lead screw 27. From the combination of the data entered for this trainee from the chart 40 measurements, the CPU will adjust the lower rotary mechanism 8 to the appropriate position on the depending arm 9. These angles and locations are adjusted using the stepper and/or servo motors, and once confirmed by digital encoders, they will indicate that the training apparatus is ready for this trainee. The lie angle L° is manually set by the player or by an assistant by so clamping the attachment plate 2 in appropriate alignment using the lever 7. Then the putter is attached to the plate 2 by clamping the shaft against the blocks with the V-shaped apertures using the eccentric cam.

Then, with the player trainee standing with both feet on the carpeted platform 25 and hands gently comfortably on the grip of the putter, the motion-generating device is actuated. During the putting stroke which the robot putter will then execute, the stepper and servo motors effect three simultaneous movements. There is rotation about two parallel axes, i.e. the shafts 18 and 12, and linear movement of the lower or first rotary mechanism 8 on the rails 9a of the swinging arm 9. Commercially available software is adapted in a straightforward manner to create these three simultaneous movements. The swinging arm 9 is rotated, with reference to a right-handed golfer facing the training device, first to the right from a center or address position; and then to the left back past the address position for the follow-through. At the same time, there is a lifting and dropping of the putter clubhead 1a as a result of movement of the casing 8 of the rotary mechanism which is driven, in the illustrated embodiment, by the servo motor 10 which drives the timing belt or the V-belt 10a first in one direction and then in the other. Also simultaneously, the shaft 12, which supports the open frame holder 6 to which the putter attachment plate 2 is clamped, is caused to oscillate by the stepper motor 16 driving the wheel 14 wherein a helical cam and groove arrangement raises and lowers the lever 13 causing rotation of the shaft 12 within the supporting tubular bearing 11 first in one direction and then in the other. It is the combination of these three movements being simultaneously executed that replicates the average swing of the trainee golfer. It can be seen that with the trainee gently grasping the grip 29 of the club 1 and experiencing this replicated swing movement time after time, he or she will quickly get the feel of that movement, and as a result, his or her muscles will become trained to execute this precise movement on the putting green of a golf course. As mentioned before, the secret in effective and accurate putting is the ability to be able to precisely execute the exact same stroke, time after time.

Other options can likewise be built into the control system. At the starting or address position, the clubhead 1a of the putter should be resting flat on the upper surface of the carpeted platform, similar to the way the clubhead of a putter rests on a putting green. If desired, the player trainee can preselect the incorporation of a forward press as a part of the swing movement to occur just prior to the start of the backstroke. A forward press is a small, gentle movement of the putter's grip 29 in the opposite direction to the backstroke that will follow. During such a forward press, the putter head 1a does not move away from its original address position. Instead, the putter head 1a rotates on a near horizontal axis, in effect reducing the loft of the club face, i.e. de-lofting the putter. Following the forward press, the putter 1 is caused to swing backwards, controlling the acceleration, speed and distance depending upon the length of putt selected and the criteria of this particular trainee determined by analysis of the tracking data. The backswing motion is achieved through the rotation of the depending arm 9 about the shaft 18 at the upper end thereof. The acceleration and the speed of the backswing are controlled by the control system consistent with the analyzed data for this player trainee.

The distance of the backstroke arc is the criterion which is controlling for the intended length of the putt to be executed, i.e. the intended distance the golf ball is to travel. The length of arc can be varied, and such is determined by entering the desired distance of the putt into the touch screen for the particular lesson being practiced. By varying this distance, a player can train to execute a putt of any particular length. At the end of desired backstroke arc movement, the motion-generating device stops momentarily before forward motion begins. If the golfer in question always executes a short momentary pause at the top of the backstroke, such a pause will be likewise executed by the putting robot or motion-generating device.

Generally, good putting practices employ a forward stroke speed faster than the backstroke and a forward arc or follow-through that is between about 15% and 25% longer than the arc of the backstroke. Accomplished putters also generally employ a forward stroke having a duration which is about only one-half the time of the backstroke, and in this way, a positive level of acceleration is achieved. In this manner, the maximum putting speed of the clubhead is reached just a short distance prior to the impact of the moving clubhead with the stationary golf ball. Such a pattern of forward motion is generated by the robot putter taking all of the above factors into consideration. As the putter clubhead begins to travel forward from the top of the backstroke, the axis of rotation 18, the lie angle L° of the putter and the plane of rotation S° are maintained; however, the clubhead of the putter should be raised slightly to avoid scraping the putting green, or here, the artificial grass or carpet on the platform 25. A small raise or lift, e.g. about a quarter-inch, is accomplished by the control system by driving the timing belt or V-belt 10a so as to raise the first rotary mechanism 8 on the parallel rails 9a. In addition, at about the point of impact, a further movement of the clubhead is preferred so that, at the time of contact with the golf ball, a slight topspin is applied to the ball; such will cause the ball to tend to roll in the line of aim as opposed to contacting the ball with a hitting or sliding motion of the clubhead. To accomplish this effect, the motion-generating device both raises the putter clubhead slightly further by moving the casing of the first rotary mechanism 8 on the rails 9a and also rotates the shaft of the putter (about the axis 12) slightly in the opposite direction of the swinging motion. This increases the loft of the face of the putter and can be observed by the trainee through the widow provided by the open tubular holder 6 to which the putter attachment plate 2 is clamped.

At the end of the forward stroke or follow-through, the robot putter will effect a short pause and then return the putter 1 to the address position from which the same stroke can then be repeated to foster training this precise stroke by constant repetition. It can be seen that the movement of the depending arm 9 is generally that of a swinging pendulum, and it is the repetition of this movement, time after time, that will enhance muscle memory and allow the faithful carrying out of this particular stroke. This replication of movement is effected by the control system's ability to cause the simultaneous movement about two parallel shafts 12 and 18 and linear adjustment along the rails 9a that creates precise replication of a golfer's swing and allows the golfer to accomplish this effective training.

As mentioned, for each player, putting swing data is collected is with the aid of a motion data recording device attached to the putter shaft. When the player swings the putter 1, simulating his or her particular putting stroke, the tracking device 51 collects hundreds of three-dimensional positions through several gyroscopes and accelerometers. These tracked positions may be accumulated and fed into the computer of the training apparatus through a cable, or they may be transmitted as they are being generated through a wireless transmitter. The CPU of the computer analyzes the data using commercially available software and creates a data bank for that particular player; this data will later be fed into the servo control system to move the stepper and/or servo motors to replicate that swing when that particular player requests a training session.

Pertinent information with respect to a player/trainee as obtained by a teaching professional through his own knowledge, the wall chart 40, the data recording device 51 or through the use of other ancillary devices, may also be entered into the computer memory via a touch screen 34. This data should include the player's name and other personal information. This information will be stored in the computer's memory and is also preferably recorded on a special magnetic card. Each such card will be dedicated to only one player and will be unique to that player. When such a card is read by a card reader associated with the touch screen of the computer 34, the computer identifies the player and can immediately address him/her by name as well as enquire as to the player's wishes, as by communication with a speaker associated with the touch screen display or through a wireless set of headphones 55 provided to the trainee. The player can then select a putting lesson from a list that will appear on the screen. The computer memory contains software that is created in a straightforward manner using known techniques that will generate a series of lessons that are progressive, so a player can select to repeat a lesson at any time or select the next lesson in line. Upon completion of a basic series of lessons, the player can select from a list of special lessons. Such special lessons may be ones created, for example, by a well-known golf personality, such as a professional tour player or a sport psychologist; such would also be created using known software techniques to drive the training apparatus.

Instead of just repeating the stroke generated by the player, the computer may ask whether the player would like it to generate an optimum stroke for the trainee premised upon the already input basic data, such as the player's body dimensions, the style in which the player holds the putter, and the putter length. Such an optimization program would use existing software techniques to enhance the recorded average swing path. Such a stroke may follow accepted good putting practices where there is no wrist break during the stroke or big muscle rotational motion, and wherein a perfect triangle is maintained between both hands and the theoretical line along the shoulder. Such basic data can be provided by a teaching professional either with or without the data collected from the wall chart for the particular player.

The card reader 42, which may alternatively be associated with the touch screen display 34, should be capable of entering new data and updating old data through the touch screen unit, and it will be password-protected so available to only one trainee. It is expected that these training apparatus will be used by golfers purchasing putting sessions. Such may be purchased one at a time for a small fee, or players may be able to purchase a number of such sessions in advance. For example, a dollar value might be recorded on the trainee's magnetic card, and after each lesson the correct amount will be deducted from the balance on the card. The card reader would be capable of displaying how much money remains after each lesson, and the sound system can be set to inform the player if there is insufficient value remaining to cover the purchase of the next training session.

Preferably the training apparatus includes such a wireless headset 55. After attaching the putter to the attachment plate 2 of the holder 6 and selecting the lesson that the player wishes to take, the player may be reminded by a message on the touch screen to wear the headset 55 that is included as a part of the apparatus. As soon as the session begins, a soundtrack guides the player. The soundtrack can be instructional or suggestive in nature; it can be putting-stroke related or psychological. Various messages can also be displayed on the touch screen throughout the session. For example, if the player offers too much resistance to the motion in any axis, a message will be displayed to reduce such pressure and a spoken warning may also be emitted. Moreover, as a safety feature, if at any time during the motion of the robot putter, an increase in resistance beyond a set amount is sensed to a movement, the device will immediately stop all motion and advise the player through a flashing message on the screen and/or an auditory notice through the headset to relax such pressure allow his or her hands to follow the swing path of the club being replicated by the motion-generating device.

To recapitulate, the training apparatus may be constructed and programmed to provide the trainee who has registered to use the apparatus with various options. It is expected that he or she will likely, at least initially, wish to train to execute the swing path that was recorded through the use of the tracking device 51. However, the computer 39 will be programmed to also offer the trainee training sessions with a swing patterned after the one he or she recorded, maintaining the same swing radius and swing plane, but having certain modifications which incorporate particular fundamentals of the putting or chipping stroke which are felt to be advantageous to the execution of a truly effective stroke. These modifications may alter the extent of backswing and proportion the follow-through thereto, change the overall acceleration during forward motion and/or incorporate a slight upward motion to impart a force to cause the golf ball to roll smoothly forward, the latter of which may incorporate a change in the loft of the putter face, and they are available in the CPU through the inclusion of software developed in accordance with known software technologies. An offer may also be made of a second alternative where the computer, as a result of its programming, executes a swing which takes the basic criteria of the data unique to the trainee and then applies such known fundamentals of putting/chipping to create a theoretically best stroke for that particular trainee player. After experiencing such, the trainee can decide if he or she would like to train to develop such a stroke. It is felt that having such options available will further enhance the attractiveness of this training apparatus to golfers of all abilities.

Additional advantages and novel features of the invention as set forth in the description will become apparent to those skilled in the art upon reflection on the foregoing. Further advantages of the invention are found in the fact that the apparatus can generate putting and chipping strokes not only similar to the one used by the trainee, but can generate strokes simulating those of known top tour golfers. Overall, a most important advantage of the invention is that by repeating the particular swing path movement selected, the trainee is introduced to positive and advantageous muscle memory of the stroke that will train him or her in its replication on the golf course itself.

An important aspect of a good putting or chipping stroke is the level of force applied to the'ball being struck. It is clear that a light tap will propel the ball a short distance while a strong blow will send the ball a long way. Distance control is very important in putting and chipping. During a training session especially dedicated to distance control, a trainee can be shown strokes from a very short and light one to a very long and forceful one. These can be graded and numbered, for example, from 1 to 10; as a result, the trainee will get a better feeling and judgment of force-distance control. On the golf course, the trainee can then estimate, according to the distance, what level of stroke is needed, and he/she will try to repeat this particular stroke. After a number of such training sessions, far better distance control should result.

Because of the substantial cost of the training apparatus, it is envisaged that most may be positioned in Pro shops and other golf training locations, where they should be available to many different players. For this reason, the use of a magnetic card reader that is incorporated as a part of the device to make it possible to conveniently accept payment per each training session will likely be most desirable.

Although the apparatus and method have been described in terms of the best mode presently known to the inventor, it should be understand that various modifications and changes that would be obvious to one having ordinary skill in this art may be made without departing from the scope of the invention, which is defined by the claims appended hereto. Particular features of the method and apparatus of the invention are emphasized in the claims that follow.

The invention claimed is:

1. A method for training a golf or chipping stroke by repetition of such stroke, which method comprises the steps of:

installing a tracking device on a shaft of a golf club that has a grip, which device includes gyroscopes and accelerometers and a recording device for creating an electronic image of the movement of the golf club from an address position through the backstroke, the forward stroke and the follow-through;

having a trainee swing the golf club multiple times to execute one desired stroke with this particular golf club, using essentially the same effort each time, so as to track and record the trainee's swing path upon said electronic tracking mechanism;

transferring said tracking data to a CPU of a putting/chipping training apparatus to provide the CPU with a record of the trainee's average swing path resulting from such multiple executions of the same stroke, which CPU is connected to drive mechanisms of a multiple axes motion-generating device which forms a part of the training apparatus;

attaching the trainee's golf club to the motion-generating device by clamping and aligning it so that the grip of the golf club assumes an angular orientation to the horizontal and a vertical distance from the ground which are the same as it did during the multiple executions of such stroke; and with the trainee's hands gently grasping the grip of the golf club, causing the motion-generating device to replicate the swinging movement of the golf club along the swing path of the trainee in executing such stroke.

2. The method of claim 1 wherein said trainee's stance is measured to determine data representative of lie angle, swing plane angle and swing radius for said trainee and wherein said putting/chipping training apparatus is adjusted to set the swing plane angle of a depending arm which swings from an axis at the upper end thereof and to locate a rotary drive mechanism that is adjustable along the length of said arm at a desired position consistent with said representative data.

3. The method according to claim 2 wherein said CPU, based upon said representative data entered for a particular golfer trainee, adjusts said motion-generating device by driving a linear motor which sets the vertical height of the axis about which the depending arm pivots.

\* \* \* \* \*